US012716010B2

(12) United States Patent
Wo et al.

(10) Patent No.: US 12,716,010 B2
(45) Date of Patent: Aug. 25, 2026

(54) CURABLE COATING COMPOSITIONS

(71) Applicant: PPG Industries Ohio, Inc., Cleveland, OH (US)

(72) Inventors: Yaqi Wo, Allison Park, PA (US); David Robert Fenn, Allison Park, PA (US); Chad Alan Landis, Oakmont, PA (US); Hyun Wook Ro, Gibsonia, PA (US); Mitchell Ryan Stibbard, Butler, PA (US); Christopher A. Verardi, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 209 days.

(21) Appl. No.: 18/832,987

(22) PCT Filed: Jan. 17, 2023

(86) PCT No.: PCT/US2023/060718
§ 371 (c)(1),
(2) Date: Jul. 25, 2024

(87) PCT Pub. No.: WO2023/147230
PCT Pub. Date: Aug. 3, 2023

(65) Prior Publication Data

US 2025/0145851 A1 May 8, 2025

Related U.S. Application Data

(60) Provisional application No. 63/267,327, filed on Jan. 31, 2022.

(51) Int. Cl.

| | |
|---|---|
| ***C09D 175/04*** | (2006.01) |
| ***C08G 18/24*** | (2006.01) |
| ***C08G 18/38*** | (2006.01) |
| ***C08G 18/62*** | (2006.01) |
| ***C08G 18/65*** | (2006.01) |

(52) U.S. Cl.
CPC ......... *C09D 175/04* (2013.01); *C08G 18/246* (2013.01); *C08G 18/3876* (2013.01); *C08G 18/6229* (2013.01); *C08G 18/65* (2013.01)

(58) Field of Classification Search
CPC ........................... C09D 175/04; C08G 18/246; C08G 18/3876; C08G 18/6229; C08G 18/65; C08G 18/4063; C08G 18/73; C08G 18/792; C08G 18/6505; B05D 7/14; B05D 7/534
See application file for complete search history.

(56) References Cited

U.S. PATENT DOCUMENTS

| | | | | |
|---|---|---|---|---|
| 4,788,083 | A | 11/1988 | Dammann et al. | |
| 5,820,925 | A | 10/1998 | Fenn et al. | |
| 9,745,401 | B2 | 8/2017 | Van Steenis et al. | |
| 2008/0119612 | A1* | 5/2008 | Scherer ................ | C08G 18/089 525/123 |

FOREIGN PATENT DOCUMENTS

| | | | |
|---|---|---|---|
| EP | 0454219 | A1 | 10/1991 |
| EP | 2822983 | B1 | 11/2018 |
| WO | 2007/020270 | A1 | 2/2007 |

OTHER PUBLICATIONS

International Search Report and Written Opinion received for PCT Application Serial No. PCT/US2023/060718 dated Apr. 4, 2023, 12 pages.

* cited by examiner

*Primary Examiner* — Michael B Nelson

(57) ABSTRACT

A coating composition includes: (a) a polymeric resin including hydroxyl functional groups; (b) a polyisocyanate crosslinker; (c) a thiol including at least 2 active hydrogen groups, where the active hydrogen groups include a thiol group or a combination of a thiol and a hydroxyl group; and (d) a tin-based catalyst. The ratio of the number of moles of thiol to the number of moles of tin in the coating composition is less than or equal to 100:1 and the amount of (d) the tin-based catalyst is less than or equal to 0.25% by weight relative to the total resin solids, and/or the ratio of the number of moles of thiol to the number of moles of tin ranges from 3:1 to 50:1 and the amount of (d) the tin-based catalyst is less than or equal to 0.4% by weight relative to the total resin solids.

17 Claims, No Drawings

CURABLE COATING COMPOSITIONS

CROSS REFERENCE TO RELATED APPLICATIONS

This application is a national stage filing of international patent application PCT/US2023/060718, filed Jan. 17, 2023, titled "CURABLE COATING COMPOSITIONS", which in turn claims priority to U.S. Provisional Application No. 63/267,327, filed Jan. 31, 2022, titled "CURABLE COATING COMPOSITIONS", each of which is incorporated herein by reference in their entireties.

FIELD OF THE DISCLOSURE

The present disclosure relates to coating compositions, multi-layer coating systems, and methods of making multi-layer coating systems.

BACKGROUND OF THE DISCLOSURE

Coatings are applied to a wide variety of substrates to provide color and other visual effects, corrosion resistance, abrasion resistance, chemical resistance, and the like.

Coatings for automotive applications such as primers, basecoats, and topcoats typically have a number of desirable properties. For example, a high solids content coating is also often desired so that resin and pigment can be transferred to a substrate surface as efficiently as possible. This results in increased application robustness, where the amount of coating lost during the application process is decreased. Additionally, a high solids content coating minimizes the amount of volatile solvent required, thereby reducing the amount of volatile solvent that is released during the coating application and baking process. These compositions can be baked and formed under low energy conditions, which includes lower temperatures and less time, which have been found useful in forming coatings at faster application times and with reduced costs, such as reduced energy costs. In addition to the properties listed above, the physical properties of a coating such as hardness, flexibility, and/or appearance should meet automotive industry standards. Attaining all of these characteristics is difficult and often certain properties have to be compromised so that other properties can be enhanced.

Early hardness relates into the efficiency of the overall vehicle (or component) manufacturing process. An early hardness allows the vehicle or component to be utilized or handled shortly after the coating is applied and baked (e.g. at elevated temperatures, such as greater than 60° C.). With an early hardness, the coating on the vehicle or component may also be touched up, sanded, or polished, as needed, immediately after baking. The longer the time it takes the coating to develop a suitable hardness, the longer a customer has to wait to handle, continue to assemble, or utilize the coated object. If a suitable hardness is not obtained with a reasonable time frame, a protective wrap may be applied to the coated vehicle or coated component so that the vehicle or component can be moved through the manufacturing process or shipped to its next or final destination. However, if a suitable hardness is not obtained and a protective wrap is applied to the coated surface too soon, the removal of the protective wrap may leave an undesirable imprint in the coating on the vehicle or component.

It is an objective of the present disclosure to provide coating compositions that can be cured at comparatively low temperatures (e.g. a temperature of 80° C.) to form coatings having various properties, such as early hardness (e.g. a hardness such that the coated vehicle or coated component can finessed (e.g. sanded, buffed, and/or polished) or be handled without causing a defect), increasing the efficiency of the coating process.

SUMMARY

The present disclosure is directed to a coating composition including: (a) a polymeric resin including hydroxyl functional groups; (b) a polyisocyanate crosslinker; (c) a thiol including at least 2 active hydrogen groups, wherein the active hydrogen groups include a thiol group or a combination of a thiol group and a hydroxyl group; and (d) a tin-based catalyst, where the ratio of the number of moles of thiol to the number of moles of tin is less than or equal to 100:1 and the amount of (d) the tin-based catalyst is less than or equal to 0.25% by weight relative to the total resin solids, and/or where the ratio of the number of moles of thiol to the number of moles of tin ranges from 3:1 to 50:1 and the amount of (d) the tin-based catalyst is less than or equal to 0.4% by weight relative to the total resin solids.

DETAILED DESCRIPTION

For the purposes of the following detailed description, it is to be understood that the disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" thiol, "an" isocyanate, and the like refer to one or more of any of these items.

As used herein, the term "polymer" is meant to refer to prepolymers, oligomers, and both homopolymers and copolymers. As used herein, "oligomeric" refers to a polymer having only a few monomer units up to ten monomer units, for example a dimer, trimer, or tetramer. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the disclosure.

As used herein, the terms "on", "applied on/over", "formed on/over", "deposited on/over", "overlay", "provided on/over", and the like mean applied, formed, overlaid, deposited, or provided on but not necessarily in direct contact with the surface. For example, a coating layer "applied over" a substrate does not preclude the presence of one or more other coating layers of the same or different composition located between the formed coating layer and the substrate.

The present disclosure is directed to a coating composition comprising: (a) a polymeric resin comprising hydroxyl functional groups; (b) a polyisocyanate crosslinker; (c) a thiol comprising at least 2 active hydrogen groups, wherein the active hydrogen groups comprise a thiol group or a combination of a thiol group and a hydroxyl group; and (d) a tin-based catalyst, wherein the ratio of the number of moles of thiol to the number of moles of tin is less than or equal to 100:1 and the amount of (d) the tin-based catalyst is less than or equal to 0.25% by weight relative to the total resin solids, and/or wherein the ratio of the number of moles of thiol to the number of moles of tin ranges from 3:1 to 50:1 and the amount of (d) the tin-based catalyst is less than or equal to 0.4% by weight relative to the total resin solids.

The coating composition may comprise a solvent medium (e.g., a solvent-borne coating composition). As used herein, a "solvent medium" refers to a liquid medium comprising greater than 50% by weight of the below described organic solvents, based on the total weight of the liquid medium, where the liquid medium is defined as water and organic solvents which are liquid at room temperature (20° C.) and volatile at 110° C., as defined by ASTM D2369-93. Such solvent mediums can for example comprise at least 60% by weight organic solvent, or at least 70% by weight organic solvent, or at least 80% by weight organic solvent, or at least 90% by weight organic solvent, or at least 95% by weight organic solvent, or 100% by weight organic solvent, based on the total weight of the solvent medium, with the remainder of the solvent medium comprising at least 40% by weight water, or at least 30% by weight water, or at least 20% by weight water, or at least 10% by weight water, or at least 5% by weight water, based on the total weight of the solvent medium. Non-limiting examples of suitable organic solvents include polar organic solvents, e.g. protic organic solvents such as glycols, glycol ether alcohols, alcohols, glycol diethers, aprotic solvents such as aromatic hydrocarbons, aliphatic hydrocarbons, volatile ketones, esters, and diesters. Water, if present, may make up less than 10% by weight of the solvent medium. The coating composition may comprise water in an amount of less than 5% by weight solvent, or less than 3% by weight solvent, or less than 1% by weight solvent.

The coating composition includes a polymeric resin comprising hydroxyl functional groups. The polymeric resin comprising hydroxyl functional groups may be a polyester polymer, an (meth)acrylic polymer, a polyurethane polymer, a polyether polymer, and/or some combination thereof. The polymeric resin comprising hydroxyl functional groups may comprise a hydroxyl equivalent weight of at least 300 grams per equivalent (g/eq), such as at least 350 g/eq, or at least 400 g/eq based on the total resin solids of the polymeric resin. The hydroxyl equivalent weight is calculated from the hydroxyl value, where the hydroxyl value is determined by titrating the polymeric resin comprising hydroxyl functional groups according to ASTM E1899. The polymeric resin comprising hydroxyl functional groups may comprise a hydroxyl equivalent weight of up to 1,000 g/eq, such as up to 500 g/eq, such as up to 450 g/eq, or up to 400 g/eq based on the total resin solids of the polymeric resin. The polymeric resin comprising hydroxyl functional groups may comprise a hydroxyl equivalent weight of from 300 g/eq to 500 g/eq, such as from 300 g/eq to 450 g/eq, such as from 350 g/eq to 450 g/eq, such as from 300 g/eq to 400 g/eq, such as from 400 g/eq to 500 g/eq, such as from 300 g/eq to 1,000 g/eq, such as from 350 g/eq to 1,000 g/eq, such as 400 g/eq to 1,000 g/eq, or such as 450 g/eq to 1,000 g/eq, based on the total resin solids of the polymeric resin.

The coating composition may include a hydroxyl functional polyester polymer. Such polymers may be prepared by condensation of polyhydric alcohols and polycarboxylic acids. Suitable polyhydric alcohols may include ethylene glycol, neopentyl glycol, trimethylol propane, pentaerythritol, hydroxyl terminated poly(ethylene oxide) and/or poly (propylene oxide), and/or some combination thereof. Suitable polycarboxylic acids may include adipic acid, 1,4-cyclohexyl dicarboxylic acid, hexahydrophthalic acid, and/or some combination thereof. Besides the polycarboxylic acids mentioned above, functional equivalents of the acids such as anhydrides where they exist or lower alkyl (e.g. $C_1$-$C_4$) esters of the acids such as the methyl esters may be used. Fatty acids, such as lauric acid, stearic acid, palmitic acid, linoleic acid, oleic acid, and the like may be used. Where it is desired to enhance air-drying, suitable drying oil fatty acids may be used and include those derived from linseed oil, soya bean oil, tall oil, dehydrated castor oil or tung oil. The polyester polymer or oligomer may be prepared using (di) lactone ring-opening type monomers such as caprolactone, lactide, and the like reacting in a ring-opening reaction with an alcohol, such as the previously described polyhydric alcohols. The polyesters may contain free terminal hydroxyl and/or carboxyl groups that are available for further crosslinking reactions. Hydroxyl-containing polyester oligomers can be prepared by reacting an anhydride of a dicarboxylic acid such as hexahydrophthalic anhydride with a diol such as neopentyl glycol in a 1:2 molar ratio. The polyester polymer may be a hyperbranched polyester polymer.

The hydroxyl functional polyester polymer may have a number average molecular weight (Mn) of less than 7,500 grams per mole (g/mol), such as less than 5,000 g/mol, such as less than 4,500 g/mol, or less than 2,000 g/mol. Mn and weight average molecular weight (Mw), as reported herein, are measured by gel permeation chromatography using a polystyrene standard according to ASTM D6579-11 performed using a Waters 2695 separation module with a Waters 2414 differential refractometer (RI detector), using tetrahydrofuran (THF) as the eluent at a flow rate of 1 milliliters per minute (ml/min), and two PLgel Mixed-C (300×7.5 mm) columns for separation at room temperature. The weight and number average molecular weight of the polymeric samples can be measured by gel permeation chromatography relative to linear polystyrene standards of 800 to 900,000 Da.

The hydroxyl functional polyester polymer may have a polydispersity index (PDI) of at least 1.5. The hydroxyl functional polyester polymer may have a PDI of up to 6.5. The hydroxyl functional polyester polymer may have a PDI of from 1.5 to 6.5, such as from 1.6 to 6.5, such as from 2 to 6.5, such as from 2.5 to 6.5. The PDI values represent a ratio of the weight average molecular weight (Mw) to the number average molecular weight (Mn) of the hydroxyl functional polyester polymer (i.e., Mw/Mn).

The hydroxyl functional polyester polymer may have a hydroxyl equivalent weight of at least 300 g/eq, such as at least 350 g/eq, or at least 400 g/eq based on the total resin solids of the polymeric resin. The hydroxyl functional polyester polymer may comprise a hydroxyl equivalent weight of up to 1,000 g/eq, such as up to 500 g/eq, such as up to 450 g/eq, or up to 400 g/eq based on the total resin solids of the polymeric resin. The hydroxyl functional polyester polymer may comprise a hydroxyl equivalent weight of from 300 g/eq to 500 g/eq, such as from 300 g/eq to 450 g/eq, such as from 350 g/eq to 450 g/eq, such as from 300 g/eq to 400 g/eq, such as from 400 g/eq to 500 g/eq, such as from 300 g/eq to 1,000 g/eq, such as from 350 g/eq to 1,000 g/eq, such as 400 g/eq to 1,000 g/eq, or such as 450 g/eq to 1,000 g/eq, based on the total resin solids of the polymeric resin. The hydroxyl equivalent weight is calculated from the hydroxyl value, where the hydroxyl value is determined by titrating the hydroxyl functional polyester polymer according to ASTM E1899.

The hydroxyl functional acrylic polymers may be copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl (meth) acrylate, butyl (meth)acrylate, and 2-ethyl hexyl (meth) acrylate, isobutyl (meth)acrylate, benzyl (meth)acrylate, stearyl (meth)acrylate, lauryl (meth)acrylate, methoxy-PEG (meth)acrylate and vinyl aromatic compounds such as styrene, alpha-methyl styrene and vinyl toluene, and/or some combination thereof. The polymerizable ethylenically unsaturated monomers may include vinyl pyrrolidone, 4-vinyl pyridine, dimethylaminoethyl acrylate (DMAEMA), and/or some combination thereof. The ratio of reactants and reaction conditions may be selected to result in an acrylic polymer with pendant hydroxyl or carboxylic acid functionality. The hydroxyl functional acrylic polymer may be prepared from a hydroxyl functional acrylic monomer reacting with a (di)lactone ring-opening type monomer, such as caprolactone, lactide, and the like reacting in a ring-opening reaction with an alcohol, such as a polyhydric alcohol. The hydroxyl functional acrylic polymer may be prepared by reacting an epoxy functional acrylic monomer, such as glycidyl methacrylate, with a monofunctional carboxylic acid containing compound, such as isostearic acid, followed by polymerizing with other unsaturated monomers as described above. The hydroxyl functional acrylic polymer may be prepared by reacting an epoxy functional acrylic monomer with a monofunctional carboxylic acid containing compound, where the epoxy functional acrylic monomer is first polymerized and then reacted with the monofunctional carboxylic acid containing compound or the epoxy functional acrylic monomer is simultaneously polymerized and reacted with the monofunctional carboxylic acid containing compound. The hydroxyl functional acrylic polymer may be prepared by reacting a carboxylic acid functional acrylic monomer, such as acrylic acid, and a mono-functional epoxy compound, such as glycidyl neodecanoate (Cardura-E mono-epoxide).

The hydroxyl functional acrylic polymer may have a number average molecular weight in a range from 1,500 g/mol to 5,000 g/mol, from 1,500 g/mol to 4,000 g/mol, or from 1,500 g/mol to 3,500 g/mol.

The hydroxyl functional acrylic polymer may have a hydroxyl equivalent weight of at least 300 g/eq, such as at least 350 g/eq, or at least 400 g/eq based on the total resin solids of the hydroxyl functional acrylic polymer. The hydroxyl functional acrylic polymer may comprise a hydroxyl equivalent weight of up to 1,000 g/eq, such as up to 500 g/eq, such as up to 450 g/eq, or up to 400 g/eq based on the total resin solids of the polymeric resin. The hydroxyl functional acrylic polymer may comprise a hydroxyl equivalent weight of from 300 g/eq to 500 g/eq, such as from 300 g/eq to 450 g/eq, such as from 350 g/eq to 450 g/eq, such as from 300 g/eq to 400 g/eq, such as from 400 g/eq to 500 g/eq, such as from 300 g/eq to 1,000 g/eq, such as from 350 g/eq to 1,000 g/eq, such as 400 g/eq to 1,000 g/eq, or such as 450 g/eq to 1,000 g/eq, based on the total resin solids of the polymeric resin. The hydroxyl equivalent weight is calculated from the hydroxyl value, where the hydroxyl value is determined by titrating the hydroxyl functional acrylic polymer according to ASTM E1899.

The hydroxyl functional acrylic polymer may have a glass transition temperature (Tg) of at least −30° C., such as at least −20° C., such as at least −10° C., such as at least 0° C. The hydroxyl functional acrylic polymer may have a Tg of less than 80° C., such as less than 80° C., such as less than 70° C., such as less than 60° C., or such as less than 50° C. The hydroxyl functional acrylic polymer may have a Tg in a range of from 0° C. to 50° C. Tg, as reported herein, is calculated according to the Flory-Fox equation unless otherwise indicated.

The hydroxyl functional acrylic polymer may have a number average molecular weight in a range from 1,500 g/mol to 5,000 g/mol, a hydroxyl equivalent weight of from 300 g/eq to 500 g/eq, and a Tg from 0° C. to 50° C.

Hydroxyl functional polyurethane polymers containing terminal isocyanate or hydroxyl groups may also be used. The polyurethane polyols or NCO-terminated polyurethanes that can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio may be adjusted and reaction conditions selected to obtain the desired terminal group.

The coating composition includes a polyisocyanate crosslinker. As used herein, a "polyisocyanate" refers to a compound that contains at least 2 or more isocyanate functional groups. The polyisocyanate crosslinker may comprise greater than 2 isocyanate functional groups reactive with hydroxyl groups, such as the hydroxyl groups of the polymeric resin comprising hydroxyl functionality.

Polyisocyanate crosslinkers that may be used include aliphatic polyisocyanates or aromatic polyisocyanates having an average isocyanate functionality of at least and/or greater than 2. The polyisocyanate crosslinkers may be unblocked polyisocyanate crosslinkers. The average isocyanate functionality of greater than 2 may be determined by measuring the weight average molecular weight by gel permeation chromatography (GPC) and by measuring the isocyanate equivalent weight, and dividing the weight average molecular weight by the isocyanate equivalent weight. The polyisocyanate crosslinkers may comprise polyisocyanate linkages, such as uretdiones, biurets, allophanates, and/or isocyanurates. Non-limiting examples of suitable polyisocyanate crosslinkers include, but are not limited to, HDI allophanates (e.g., DESMODUR 3580 BA, DESMODUR XP 2860), HDI uretdiones (e.g., DESMODUR N 3400, DESMODUR XP 2840), HDI biuret trimers (e.g., BASONAT HB (commercially available from BASF (Ludwigshafen, Germany)), DESMODUR N100, DESMODUR N 3200, DESMODUR N 75), MDI allophanate-modified prepolymers (e.g., MONDUR® MA 2603), IPDI isocyanurates (e.g., DESMODUR Z 4470 BA, DESMODUR Z 4470 SN, DESMODUR Z 4470 MPA/X), IPDI allophanates (e.g., DESMODUR XP 2565, BAYHYDUR® XP2759, BAYHYDUR® 401-70 MPA/X, all commercially available from Covestro (Leverkusen, Germany)) unless otherwise indicated, and mixtures or combinations thereof.

The coating composition includes a thiol comprising at least 2 active hydrogen groups. The active hydrogen groups of the thiol comprise a thiol group or a combination of a thiol group and a hydroxyl group. The thiol comprising at least 2 active hydrogen groups may comprise at least two active hydrogen groups, such as at least three active hydrogen groups, or at least four active hydrogen groups. The thiol comprising at least 2 active hydrogen groups may comprise up to four active hydrogen groups or up to three active hydrogen groups. The thiol comprising at least 2 active hydrogen groups may comprise at least at least one thiol group, at least two thiol groups, at least three thiol groups, or at least four thiol groups. The thiol comprising at least 2 active hydrogen groups may comprise one thiol group, up to two thiol groups, such as up to three thiol groups, or up to four thiol groups. The thiol comprising at least 2 active hydrogen groups may comprise one thiol group and two hydroxyl groups.

Non-limiting examples of the thiol comprising at least 2 active hydrogen groups include, but are not limited to, pentaerythritol tetrakis(3-mercaptoacetate), 1-thioglycerol, trimethylolpropane tri (3-mercaptopropionate), 2,3-bis((2-mercaptoethyl)thio)-1-propanethiol, and/or some combination thereof.

The thiol comprising at least 2 active hydrogen groups may comprise at least 4 thiol groups and may comprise a thiol equivalent weight of at least 100 grams per equivalents (g/eq), such as at least 110 g/eq, or at least 120 g/eq based on the total resin solids of the thiol comprising at least 2 active hydrogen groups. The thiol comprising at least 2 active hydrogen groups may comprise at least 4 thiol groups and may comprise a thiol equivalent weight of up to 400 g/eq, such as up to 350 g/eq, or up to 300 g/eq based on the total resin solids of the thiol comprising at least 2 active hydrogen groups. The thiol comprising at least 2 active hydrogen groups may comprise at least 4 thiol groups and may comprise a thiol equivalent weight of from 100 to 400 g/eq, such as from 100 to 350 g/eq, such as from 100 to 300 g/eq, such as from 110 to 400 g/eq, such as from 110 to 350 g/eq, such as from 110 to 300 g/eq, such as from 120 to 400 g/eq, such as from 120 to 350 g/eq, or from 120 to 300 g/eq, based on the total resin solids of the thiol comprising at least 2 active hydrogen groups. The thiol equivalent weight may be calculated from the thiol value, where the thiol value is determined by titrating the thiol comprising at least 2 active hydrogen groups according to ASTM D 3227. Alternatively, the thiol equivalent weight may be calculated based on the molecular weight of the thiol compound.

The thiol comprising at least 2 active hydrogen groups may comprise at least 4 thiol groups and may comprise at least two carbon atoms of separation from the thiol group and a carbonyl carbon (the count of carbon atoms not including the carbon of the carbonyl carbon). As used herein, the "carbonyl carbon" is a carbon atom that is double bonded to an oxygen atom. The thiol comprising at least 2 active hydrogen groups may comprise at least 4 thiol groups and may comprise at least ten backbone atoms of separation between each thiol group. As used herein, "backbone atoms" are atoms, such as carbon, oxygen, and nitrogen atoms, that are covalently bonded to other atoms in an uninterrupted chain.

The coating composition includes a tin-based catalyst. The tin-based catalyst may be an organic tin catalyst. As used herein, "organic tin catalyst" is a chemical compound having one or more tin atoms bound to an organic ligand. Non-limiting examples of suitable organic tin catalysts include, but are not limited to, dibutyltin dilaurate, dibutyltin diacetate, dibutyltin mercaptide, dibutyltin diacetate, dibutyl tin dimaleate, dimethyl tin diacetate, dimethyl tin dilaurate, tin octoate, and/or some combination thereof.

The coating composition including a thiol comprising at least 2 active hydrogen groups and tin-based catalyst may have a ratio of the number of moles of thiol to the number of moles of tin be less than or equal to 100:1 and an amount of the tin-based catalyst may be from greater than or equal to 0.05% by weight, or greater than or equal to 0.06% by weight, relative to the total resin solids, and less than or equal to 0.25% by weight, such as less than 0.24% by weight, such as less than or equal to 0.15% by weight, or less than or equal to 0.12% by weight, relative to the total resin solids. The coating composition including a thiol comprising at least 2 active hydrogen groups and tin-based catalyst may have a ratio of the number of moles of thiol to the number of moles of tin be less than or equal to 100:1 and an amount of the tin-based catalyst may be greater than or equal to 0.05% by weight to less than or equal to 0.25% by weight, such as greater than or equal to 0.05% by weight to less than or equal to 0.24% by weight, such as greater than or equal to 0.05% by weight to less than or equal to 0.15% by weight, or such as 0.05% by weight to less than or equal to 0.12% by weight, relative to the total resin solids. The coating composition including a thiol comprising at least 2 active hydrogen groups and tin-based catalyst may have a ratio of the number of moles of thiol to the number of moles of tin be less than or equal to 100:1 and an amount of the tin-based catalyst may be greater than or equal to 0.06% by weight to less than or equal to 0.25% by weight, such as greater than or equal to 0.06% by weight to less than or equal to 0.24% by weight, such as greater than or equal to 0.06% by weight to less than or equal to 0.15% by weight, or such as 0.06% by weight to less than or equal to 0.12% by weight, relative to the total resin solids. As used herein "total resin solids" is the total solids weight of the polymeric resin comprising hydroxyl functional groups, the polyisocyanate crosslinker, the thiol comprising at least 2 active hydrogen groups, and any additional resin components in the coating composition.

The coating composition including a thiol comprising at least 2 active hydrogen groups and tin-based catalyst may additionally or alternatively have a ratio of the number of moles of thiol to the number of moles of tin ranging from 3:1 to 50:1 and an amount of tin-based catalyst from greater than or equal to 0.05% by weight, or greater than or equal to 0.06% by weight, relative to the total resin solids, and less than or equal to 0.4% by weight, such as less than or equal to 0.36% by weight, such as less than or equal to 0.25% by weight, such as less than or equal to 0.24% by weight, such as less than or equal to 0.15% by weight, or less than or equal to 0.12% by weight relative to the total resin solids. The coating composition including a thiol comprising at least 2 active hydrogen groups and tin-based catalyst may additionally or alternatively have a ratio of the number of moles of thiol to the number of moles of tin ranging from 3:1 to 50:1 and an amount of tin-based catalyst from greater than or equal to 0.05% by weight to less than or equal to 0.4% by weight, such as greater than or equal to 0.05% by weight to less than or equal to 0.36% by weight, such as greater than or equal to 0.05% by weight to less than or equal to 0.25% by weight, such as greater than or equal to 0.05% by weight to less than or equal to 0.24% by weight, such as greater than or equal to 0.05% by weight to less than or equal to 0.15% by weight, or such as greater than or equal to 0.05% by weight to less than or equal to 0.12% by weight, relative to the total resin solids. The coating composition including a thiol comprising at least 2 active hydrogen groups and tin-based catalyst may additionally or alternatively have a ratio of the number of moles of thiol to the number of moles of tin ranging from 3:1 to 50:1 and an amount of tin-based catalyst from greater than or equal to 0.06% by weight to less than or equal to 0.4% by weight, such as greater than or equal to 0.06% by weight to less than or equal to 0.36% by weight, such as greater than or equal to 0.06% by weight to less than or equal to 0.25% by weight, such as greater than or equal to 0.06% by weight to less than or equal to 0.24% by weight, such as greater than or equal to 0.06% by weight to less than or equal to 0.15% by weight, or such as greater than or equal to 0.06% by weight to less than or equal to 0.12% by weight, relative to the total resin solids.

The coating composition including a thiol comprising at least 2 active hydrogen groups and tin-based catalyst may have a ratio of the number of moles of thiol to the number of moles of tin ranging from 3:1 to 20:1 and an amount of tin-based catalyst from greater than or equal to 0.05% by weight, or greater than or equal to 0.06% by weight, relative to the total resin solids, and less than or equal to 0.4% by weight, such as less than or equal to 0.36%, such as less than or equal to 0.25% by weight, such as less than or equal to 0.15% by weight, or less than or equal to 0.12% by weight relative to the total resin solids. The coating composition including a thiol comprising at least 2 active hydrogen groups and tin-based catalyst may have a ratio of the number of moles of thiol to the number of moles of tin ranging from 3:1 to 20:1 and an amount of tin-based catalyst from greater than or equal to 0.05% by weight to less than or equal to 0.4% by weight, such as greater than or equal to 0.05% by weight to less than or equal to 0.36% by weight, such as greater than or equal to 0.05% by weight to less than or equal to 0.25% by weight, such as greater than or equal to 0.05% by weight to less than or equal to 0.15% by weight, or such as greater than or equal to 0.05% by weight to less than or equal to 0.12% by weight, relative to the total resin solids. The coating composition including a thiol comprising at least 2 active hydrogen groups and tin-based catalyst may have a ratio of the number of moles of thiol to the number of moles of tin ranging from 3:1 to 20:1 and an amount of tin-based catalyst from greater than or equal to 0.06% by weight to less than or equal to 0.4% by weight, such as greater than or equal to 0.06% by weight to less than or equal to 0.36% by weight, such as greater than or equal to 0.06% by weight to less than or equal to 0.25% by weight, such as greater than or equal to 0.06% by weight to less than or equal to 0.15% by weight, or such as greater than or equal to 0.06% by weight to less than or equal to 0.12% by weight, relative to the total resin solids.

The coating composition including a thiol comprising at least 2 active hydrogen groups and tin-based catalyst may have a ratio of the number of moles of thiol to the number of moles of tin ranging from 10:1 to 40:1 and an amount of tin-based catalyst from greater than or equal to 0.05% by weight, or greater than or equal to 0.06% by weight, relative to the total resin solids and less than or equal to 0.25% by weight, such as less than or equal to 0.24% by weight, such as less than or equal to 0.15% by weight, or less than or equal to 0.12% by weight relative to the total resin solids. The coating composition including a thiol comprising at least 2 active hydrogen groups and tin-based catalyst may have a ratio of the number of moles of thiol to the number of moles of tin ranging from 10:1 to 40:1 and an amount of tin-based catalyst from greater than or equal to 0.05% by weight to less than or equal to 0.25% by weight, such as greater than or equal to 0.05% by weight to less than or equal to 0.24% by weight, such as greater than or equal to 0.05% by weight to less than or equal to 0.15% by weight, or such as greater than or equal to 0.05% by weight to less than or equal to 0.12% by weight, relative to the total resin solids. The coating composition including a thiol comprising at least 2 active hydrogen groups and tin-based catalyst may have a ratio of the number of moles of thiol to the number of moles of tin ranging from 10:1 to 40:1 and an amount of tin-based catalyst from greater than or equal to 0.06% by weight to less than or equal to 0.25% by weight, such as greater than or equal to 0.06% by weight to less than or equal to 0.24% by weight, such as greater than or equal to 0.06% by weight to less than or equal to 0.15% by weight, or such as greater than or equal to 0.06% by weight to less than or equal to 0.12% by weight, relative to the total resin solids.

The coating composition may further comprise pigments and/or fillers. Suitable pigments may be selected from organic and inorganic color pigments which may include titanium dioxide, carbon black, lampblack, zinc oxide, and extender pigments including fumed, colloidal, and crystalline silica, barium sulfate, magnesium silicate, calcium silicate, mica, clay, micaceous iron oxide, calcium carbonate, zinc powder, aluminum and aluminum silicate, gypsum, feldspar and the like. The coating composition may be substantially free, essentially free, or completely free of pigment. As used herein, the term "substantially free of pigment" means that the coating composition comprises less than 5% by weight of pigment based on total solids of the coating composition. As used herein, the term "essentially free of pigment" means that the coating composition comprises less than 1% by weight of pigment based on total solids of the coating composition. As used herein, the term "completely free of pigment" means that the coating composition comprises 0% by weight of pigment based on total solids of the coating composition.

The coating composition may include one or more further additives including, but not limited to, plasticizers, surfactants, antioxidants, ultraviolet light absorbers, corrosion inhibitors, stabilizers, rheology control agents, flow control agents, thixotropic agents such as bentonite clay, coalescing agents, organic co-solvents, catalysts, abrasion resistant particles, and/or other customary auxiliaries.

A solvent or solvent blend may be utilized to reduce the viscosity of the coating composition, such as a viscosity that allows the coating composition to be adequately stirred and/or applied to a substrate, such as a viscosity of less than 220 centipoise, as measured by ASTM D4287 and at 23° C. Non-limiting examples of suitable solvents include any of those organic solvents previously described above.

As used herein, the coating composition includes the (a) polymeric resin comprising hydroxyl functional groups, (b) polyisocyanate crosslinker, (c) thiol comprising at least 2 active hydrogen groups, (d) tin-based catalyst and any solvent needed to initially adjust the viscosity.

The coating composition may exhibit a viscosity of less than 220 centipoise 120 minutes after mixing the (a) polymeric resin comprising functional groups, (c) the thiol comprising at least 2 active hydrogen groups, and the (d) tin-based catalyst with the (b) polyisocyanate crosslinker, as measured according to ASTM D4287 and at 23° C. The viscosity of less than 220 centipoise 120 minutes after mixing the (a) polymeric resin comprising functional groups, (c) the thiol comprising at least 2 active hydrogen groups, and the (d) tin-based catalyst with the (b) polyisocyanate crosslinker, as measured according to ASTM D4287 and at 23° C., is the viscosity of the coating composition with no additional solvent added during or after the 120 minute period.

The coating composition may be applied to a substrate and cured to form a coating thereover. The coating may be a continuous film formed over at least a portion the substrate. The coating composition may be applied as a liquid composition to the substrate.

The substrate over which the coating composition may be applied includes a wide range of substrates. For example, the coating composition of the present disclosure can be applied to a vehicle substrate, an industrial substrate, an aerospace substrate, and the like.

The vehicle substrate may include a component of a vehicle. In the present disclosure, the term "vehicle" is used in its broadest sense and includes all types of aircraft, spacecraft, watercraft, and ground vehicles. For example, the vehicle can include, but is not limited to an aerospace substrate (a component of an aerospace vehicle, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like). The vehicle can also include a ground vehicle such as, for example, animal trailers (e.g., horse trailers), all-terrain vehicles (ATVs), cars, trucks, buses, vans, heavy duty equipment, tractors, golf carts, motorcycles, bicycles, snowmobiles, trains, railroad cars, and the like. The vehicle can also include watercraft such as, for example, ships, boats, hovercrafts, and the like. The vehicle substrate may include a component of the body of the vehicle, such as an automotive hood, door, trunk, roof, and the like; such as an aircraft or spacecraft wing, fuselage, and the like; such as a watercraft hull, and the like.

The coating composition may be suitable as a protective marine coating for coating marine equipment, such as a protective marine coating for ship hulls.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

The coating composition may be applied over storage tanks, windmills, nuclear plant components, packaging substrates, wood flooring and furniture, apparel, electronics, including housings and circuit boards, glass and transparencies, sports equipment, including golf balls, stadiums, buildings, bridges, and the like.

The substrate over which the coating composition may be applied includes a wide range of substrates. For example, the coating composition of the present disclosure can be applied to a metallic substrate or a non-metallic substrate. Metallic substrates include, but are not limited to, tin, steel (including electrogalvanized steel, cold rolled steel, hot-dipped galvanized steel, among others), iron, aluminum, aluminum alloys, zinc-aluminum alloys, steel coated with a zinc-aluminum alloy, and aluminum plated steel. Non-metallic substrates include polymeric materials, plastic and/or composite material, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly(ethyleneterephthalate) (PET), polycarbonate, polycarbonate acrylobutadiene styrene (PC/ABS), wood, veneer, wood composite, particle board, medium density fiberboard, cement, stone, glass, paper, cardboard, textiles, leather, both synthetic and natural, and the like. The substrate may comprise a metal, a plastic and/or composite material, and/or a fibrous material. The fibrous material may comprise a nylon and/or a thermoplastic polyolefin material with continuous strands or chopped carbon fiber. The substrate can be one that has already been treated or coated in some manner.

The coating composition of the present disclosure may be particularly beneficial when applied to a metallic substrate. The coatings of the present disclosure may be particularly beneficial when applied to metallic substrates that are used to fabricate automotive vehicles, such as cars, trucks, heavy duty agricultural equipment, and heavy duty construction equipment; architectural structures, such as bridges; and aluminum in aerospace applications.

The coating composition may be applied to a substrate having multiple components, wherein the coating composition is simultaneously applied to the multiple components and simultaneously cured to form a coating over the multiple components without deforming, distorting, or otherwise degrading any of the components. The components may be parts of a larger whole of the substrate. The components may be separately formed and subsequently arranged together to form the substrate. The components may be integrally formed to form the substrate.

Non-limiting examples of components of a substrate in the vehicle context include a vehicle body (e.g., made of metal) and a vehicle bumper (e.g., made or plastic) which are separately formed and subsequently arranged to form the substrate of the vehicle. Further examples include a plastic automotive component, such as a bumper or fascia in which the bumper or fascia comprises regions or subcomponents which comprise more than one type of substrate. Further examples include aerospace or industrial components comprising more than one substrate type. It will be appreciated that other such multi-component substrates are contemplated within the context of this disclosure.

The multiple components may include at least a first component and a second component, and the first component and the second component may be formed from different materials. As used herein, "different materials" refers to the materials used to form the first and second component having different chemical make-ups.

The different materials may be from the same or different class of materials. As used herein, a "class of materials" refers to materials that may have a different specific chemical make-up but share the same or similar physical or chemical properties. For example, metals, polymers, ceramics, and composites may be defined as different classes of materials. However, other classes of materials may be defined depending on similarities in physical or chemical properties, such as nanomaterials, biomaterials, semiconductors, and the like. Classes of materials may include crystalline, semi-crystalline, and amorphous materials. Classes of materials, such as for polymers, may include thermosets, thermoplastics, elastomers, and the like. Classes of materials, such as for metals, may include alloys and non-alloys. As will be appreciated from the above exemplary list of classes, other relevant classes of materials may be defined based on a given physical or chemical property of materials.

The first component may be formed from a metal, and the second component may be formed from a plastic or a composite. The first component may be formed from a plastic, and the second component may be formed from a metal or a composite. The first component may be formed from a composite, and the second component may be formed from a plastic or a metal. The first component may be formed from a first metal, and the second component may be formed from a second metal different from the first metal. The first component may be formed from a first plastic, and the second component may be formed from a second plastic different from the first plastic. The first component may be formed from a first composite, and the second component may be formed from a second composite different from the first composite. As will be appreciated from these non-limiting examples, any combination of different materials from the same or different classes may form the first and second components of the substrate.

Examples of combinations of materials include thermoplastic polyolefins (TPO) and metal, TPO and acrylonitrile butadiene styrene (ABS), TPO and acrylonitrile butadiene styrene/polycarbonate blend (ABS/PC), polypropylene and TPO, TPO and a fiber reinforced composite, and other combinations. Further examples include aerospace substrates or industrial substrates comprising various components made of a plurality of materials, such as various metal-plastic, metal-composite, and/or plastic-composite containing components. The metals may include ferrous metals and/or non-ferrous metals. Non-limiting examples of non-ferrous metals include aluminum, copper, magnesium, zinc, and the like, and alloys including at least one of these metals. Non-limiting examples of ferrous metals include iron, steel, and alloys thereof.

The first component and the second component (the materials thereof) may exhibit different physical or chemical properties when exposed to elevated temperatures. For example, the first component may deform, distort, or otherwise degrade at a temperature lower than the second component. Non-limiting examples of material properties which may indicate whether a first component deforms, distorts, or otherwise degrades at a temperature lower than the second component include: heat deflection temperature, embrittlement temperature, softening point, and other relevant material properties associated with deformation, distortion, or degradation of materials.

For example, the first component may deform, distort, or otherwise degrade at temperatures ranging from above 80° C. to 120° C., whereas the second component may not deform, distort, or otherwise degrade at temperatures within or below this range. The first component may deform, distort, or otherwise degrade at temperatures below 120° C., such as below 110° C., below 100° C., or below 90° C., whereas the second component may not deform, distort, or otherwise degrade at temperatures within these ranges.

When the coating composition is applied to the substrate having multiple components simultaneously, the applied coating composition may be cured at a temperature which does not deform, distort, or otherwise degrade either of the first and second component (the materials thereof). Thus, the curing temperature may be below the temperature at which either of the first component or the second component would deform, distort, or otherwise degrade.

The coating composition may be cured at temperatures ranging from 20° C. to 160° C., 20° C. to 140° C., 20° C. to 120° C., 20° C. to 100° C., 20° C. to 90° C., 20° C. to 80° C., 40° C. to 160° C., 40° C. to 140° C., 40° C. to 120° C., 40° C. to 100° C., 40° C. to 90° C., 40° C. to 80° C., 60° C. to 160° C., 60° C. to 140° C., 60° C. to 120° C., 60° C. to 100° C., 60° C. to 90° C., 60° C. to 80° C., 80° C. to 160° C., 80° C. to 140° C., 80° C. to 120° C., or 80° C. to 100° C. where neither the first component nor the second component would deform, distort, or otherwise degrade within that range. The coating composition may be cured at temperatures less than or equal to 160° C., less than or equal to 140° C., less than or equal to 120° C., less than or equal to 110° C., less than or equal to 100° C., less than or equal to 90° C., less than or equal to 80° C., less than or equal to 70° C., less than or equal to 60° C., less than or equal to 50° C., less than or equal to 40° C., less than or equal to 30° C., or ambient temperature (20° C.-25° C.) where neither the first component nor the second component would deform, distort, or otherwise degrade within these ranges.

Therefore, the coating composition may be curable at relatively low temperatures, within the ranges mentioned above, such that components formed from different materials may be simultaneously coated with the coating composition and cured to form a coating thereover without deforming, distorting, or otherwise degrading either component.

The coating compositions may be cured at the temperatures provided above for a time ranging from 10 minutes to 60 minutes, 10 minutes to 50 minutes, 10 minutes to 40 minutes, 10 minutes to 30 minutes, 10 minutes to 20 minutes, 15 minutes to 60 minutes, 15 minutes to 50 minutes, 15 minutes to 40 minutes, 15 minutes to 30 minutes, 20 minutes to 60 minutes, 20 minutes to 60 minutes, 20 minutes to 50 minutes, 20 minutes to 40 minutes, 20 minutes to 30 minutes, 25 minutes to 60 minutes, 25 minutes to 50 minutes, 25 minutes to 40 minutes, 25 minutes to 30 minutes, 30 minutes to 60 minutes, 30 minutes to 50 minutes, 30 minutes to 40 minutes. The coating composition may be cured for a time that is less than or equal to 60 minutes, less than or equal to 50 minutes, less than or equal to 40 minutes, less than or equal to 30 minutes, or less than or equal to 20 minutes. Coating compositions that may be cured at ambient temperatures (20° C.-25° C.) may take longer to cure than coating compositions that are cured by heating.

The coating compositions may be cured at a temperature for a time that allows for an early hardness, such that the coated substrate can be utilized or handled without causing defects to the coating. The coating compositions may be cured at a temperature of 80° C. or less for a time of less than or equal to 60 minutes.

If curing is carried out a temperature in the range of from 80° C. to 120° C., curing time may range from 20 minutes to 60 minutes.

The coating composition of the present disclosure can be used in a precision application. As used herein, "precision application" refers to the ability to apply the coating composition over a desired region of a substrate without applying the coating composition over an undesired region of the substrate. This may enable application of the coating composition over the desired region of the substrate without masking the undesired region of the substrate with a removable material (such as taping materials for example).

The coating composition can be applied over at least a portion of the substrate or another coating layer by any means, such as spraying, electrostatic spraying, dipping, rolling, brushing, and the like. The coating composition can also be applied with precision application devices that can apply the coating composition without any overspray. Such devices can therefore apply the coating composition of the present disclosure over a substrate that is not masked with a removable material (such as taping materials for example). The chemistry of the coating composition of the present disclosure used in combination with the precision application devices may enable the coating composition to be applied over at least a portion of the substrate without overspray.

It should be appreciated that precision application devices that apply coating compositions without overspray can be used to produce a desired pattern and/or design over the substrate. For example, these application devices can apply coating compositions in a single pass without masking the substrate to produce two or more colors over different portions of the substrate.

Non-limiting examples of precision application devices that can apply coating compositions without overspray include devices that apply compositions as a continuous jet, as continuous droplets, and/or as a drop on-demand. Specific non-limiting examples of such devices include continuous inkjet printers, gas-ejection droplet generators, vibrating tip droplet generators, piezo-actuated micropneumatic droplet generators, and electrohydrodynamic droplet generators.

In accordance with the present disclosure, each precision application device may comprise a nozzle or valve containing device that has one or more nozzle openings or orifices that expel coating compositions as droplets or jets. Such devices may be, for example, a printhead containing one or more nozzles, or an applicator containing one or more nozzles or valves, such as a valve jet applicator. Each nozzle or valve containing device may be actuated via a piezoelectric, thermal, acoustic, or ultrasonic trigger or input, such as an ultrasonic spray applicator employing ultrasonic energy to an ultrasonic nozzle. Any suitable precision application device for applying a coating composition may be configured to use in a continuous feed method, drop-on-demand method, or, selectively, both methods. Further, any suitable applicator device can be configured to apply a coating composition to a specific substrate, in a specific pattern, or both. Still further, the precision application device can comprise any number of nozzles or valves which can be arranged to form a nozzle or valve assembly configured to apply a coating composition to a specific substrate, in a specific pattern, or both. Likewise, two or more separate precision application devices can be arranged to form a single assembly. Thus, the nozzles or valves of a precision application device or set of multiple precision application devices in an assembly thereof, may have any configuration known in the art, such as linear, concave relative to the substrate, convex relative to the substrate, circular, or gaussian.

The coating composition formed from the coating system can be applied to a substrate to form a pigmented topcoat. The pigmented topcoat may be the topmost coating layer so as not to include a clearcoat or any other coating layer thereover. The pigmented topcoat may be applied directly to the substrate. The pigmented topcoat may be applied over a primer layer or a pretreatment layer.

The coating composition can be applied to a substrate as a coating layer of a multi-layer coating system, such that one or more additional coating layers are formed below and/or above the coating formed from the coating composition. The coating composition of the present disclosure may form a primer layer, basecoat layer, clearcoat layer, and/or topcoat layer of the multi-layer coating system.

The coating composition can be applied to a substrate as a primer coating layer of the multi-layer coating system. A "primer coating layer" refers to an undercoating that may be deposited onto a substrate (e.g., directly or over a pretreatment layer) in order to prepare the surface for application of a protective or decorative coating system.

The coating composition can be applied to a substrate as a basecoat layer of the multi-layer coating system. A "basecoat" refers to a coating that is deposited onto a primer overlying a substrate and/or directly onto a substrate, optionally including components (such as pigments) that impact the color and/or provide other visual impact. A clearcoat may be applied over the basecoat layer.

The coating composition can be applied to a substrate as a topcoat layer of the multi-layer coating system. A "topcoat" refers to an outermost coating that is deposited over another coating layer, such as a basecoat, to provide a protective and/or decorative layer, such as the previously described pigmented topcoat.

The topcoat layer used with the multi-layer coating system of the present disclosure may be a clearcoat layer, such as a clearcoat layer applied over a basecoat layer. As used herein, a "clearcoat" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clearcoat can comprise colorants, such as pigments, provided that the colorants do not interfere with the desired transparency of the clearcoat. The clearcoat can be substantially free (e.g., less than 5% by weight pigment based on total solids of the coating composition), essentially free of pigment (e.g., less than 1% by weight pigment based on the told solids of the coating composition), or completely free of pigments (e.g. 0% by weight pigment based on the total solids of the coating composition).

The coating composition may be applied over a substrate as a layer in a multi-layer coating system. In the multi-layer coating system, a first coating layer may be applied over at least a portion of a substrate, wherein the first coating layer is formed from a first coating composition. A second coating layer may be applied over at least a portion of the first coating layer, wherein the second coating layer is formed from a second coating composition. The second coating layer may be applied after the first coating composition has been cured to form the first coating layer or may be applied in a wet-on-wet process prior to the curing of the first coating composition, after which the first coating composition and the second coating compositions are simultaneously cured to form the first and second coating layers. The first coating layer may be flashed under ambient conditions (20° C.-25° C.) or flashed with heat (a temperature from 25° C. to 80° C.) to partially evaporate off some or all of the solvents prior to the application the second coating layer. The second coating layer may be applied after the first coating composition has been dehydrated to form the first coating layer. The first coating composition may be a primer composition or a basecoat composition. The second coating composition may a pigmented topcoat composition or a clearcoat composition. Thus, the first coating layer may be a primer layer or a basecoat layer, and the second coating layer may be a pigmented topcoat layer or a clearcoat layer. The second coating layer of the multi-layer coating system may be the outermost layer.

At least one of the first coating composition and the second coating composition may be the coating composition of the present disclosure. The first coating composition may be the coating composition of the present disclosure. The second coating composition may be the coating composition of the present disclosure. The first and second coating compositions may be the same or different coating composition. The first and second coating compositions may both comprise the coating composition of the present disclosure. The first and second coating compositions may be different with only one of the first or second coating compositions comprising the coating composition of the present disclosure.

The coating composition may be applied over a substrate as a layer in a multi-layer coating system. In the multi-layer coating system, a first coating layer may be applied over at least a portion of a substrate, wherein the first coating layer is formed from a first coating composition. A second coating layer may be applied over at least a portion of the first coating layer, wherein the second coating layer is formed from a second coating composition. A third coating layer may be applied over at least a portion of the second coating layer, wherein the third coating layer is formed from a third coating composition. The second coating layer may be applied after the first coating composition has been cured to form the first coating layer or may be applied in a wet-on-wet process prior to curing the first coating composition, after which the first and second coating compositions are simultaneously cured to form the first and second coating layers. The third coating layer may be applied after both the first and second coating compositions are cured to form the first and second coating layers. The first coating composition may be cured to form the first coating layer and the second coating composition may be applied over the first coating layer. The third coating layer may be applied in a wet-on-wet process prior to curing the second coating composition, after which the second and third coating compositions are simultaneously cured to form the second and third coating layers. The third coating layer may be applied in a wet-on-wet-on-wet process prior to curing the first and second coating compositions, after which the first, second, and third coating compositions are simultaneously cured to form the first, second, and third coating layers. The first and second coating layers may be flashed under ambient conditions or flashed with heat to partially evaporate off some or all of the solvents prior to the application the third coating layer. The third coating layer may be applied after the first and second coating compositions have been dehydrated to form the first and second coating layers. The first coating composition may be a primer composition or a basecoat composition. The second coating composition may a basecoat composition. The third coating composition may be a pigmented topcoat composition or a clearcoat composition. Thus, in the multi-layer coating system, the first coating layer may be a primer layer or a basecoat layer. The second coating layer may be a basecoat layer. The third coating layer may be a clearcoat layer. The third coating layer of the multi-layer coating system may be the outermost layer.

At least one of the first, second, or third coating compositions may be the coating composition of the present disclosure. The first, second, and third coating compositions may be the same or different composition. The first, second, and third coating compositions may all comprise the coating composition of the present disclosure. The first coating composition may be the coating composition of the present disclosure. The second coating composition may be the coating composition of the present disclosure. The third coating composition may be the coating composition of the present disclosure. The first, second, and third coating compositions may be different with only one of the first, second, or third coating compositions comprising the coating composition of the present disclosure. The first, second, and third coating compositions may be different with only two of the first, second, or third coating compositions comprising the coating composition of the present disclosure.

The coating composition may be a multi-component composition, such as a two component composition ("2K") or more, which has at least two components that are maintained in a different container after manufacture, during storage, etc. prior to application and formation of the coating over a substrate.

The present disclosure may be directed to a two-component coating system including a first component and second component. The first component includes the polymeric resin including hydroxyl functional groups, the thiol including at least 2 active hydrogen groups, and optionally the tin-based catalyst. The second component includes the polyisocyanate crosslinker, and optionally the tin-based catalyst if it is not present in the first component. The second component is separate from the first component.

The first component and second components may be stored in separate containers (also referred to herein as "packs") prior to mixing, such as until a user is ready to apply the coating composition to a substrate. As such, the first and second components may not be in contact with one another until the user is ready to apply the coating composition to the substrate.

The coating composition may be formed by contacting amounts of the first component and the second component, such as by combining at least a portion of the contents of the separate first and second containers into a mixing container. The first and second components may be combined in a predetermined ratio or at a predetermined stoichiometric ratio of reactive functional groups on a component of the first and second components to form the coating composition. The ratio of active hydrogen groups to isocyanate groups in the coating system (e.g., from the thiol including at least 2 active hydrogen groups and the polyisocyanate crosslinker, respectively) may range from 1.5:1 to 1:1.5, such as from 1.2:1 to 0.9:1 or from 1.1:1 to 1:1.1. The ratio of active hydrogen groups to isocyanate groups in the coating system may be greater than or equal to 1:1. The coating system may include active hydrogen groups in excess of isocyanate groups. A mixer may mix the added first and second components which form the coating composition to form a homogenous mixture thereof.

The coating system may be applied to a substrate and cured to form a coating thereover by contacting the first component and the second component (from their separate containers) to form a coating composition and applying the formed coating composition over the substrate prior to full curing of the coating composition (e.g., within 48, 24, 12, or 8 hours of first contacting the first and second components).

The coating layer formed from the coating composition of the present disclosure, may exhibit a viscosity of less than 220 centipoise 120 minutes after mixing the (a) polymeric resin comprising functional groups, (c) the thiol comprising at least 2 active hydrogen groups, and the (d) tin-based catalyst with the (b) polyisocyanate crosslinker, as measured according to ASTM D4287 and at 23° C. The multi-layer coating and/or the coating layer formed from the coating composition may exhibit an appearance of greater than 75 in distinctness of image (DOI), as measured according to ASTM E430, an appearance of not greater than 50 in the shortwave (SW), and/or a 7 day hardness value of at least 45, as measured according to ASTM D4366-16, when cured.

The coating composition of the present disclosure has the combination of an excellent pot-life, coating appearance, and/or coating hardness. By "pot-life" is meant the time within which the coating composition must be used before the coating composition becomes too viscous (i.e., reaches the gel point) to be applied due to cross-linking or curing. When the coating composition becomes too viscous, the coating composition may not be able to be applied to the substrate, such as through spray application, and the viscosity may not be decreased by adding additional solvents.

The present disclosure also relates to a method of making a multi-layer coating system, the method including: applying a first coating composition over at least a portion of a substrate, applying a second coating composition over at least a portion of the first coating composition, and heating the first coating composition and second coating composition to a temperature of at least 80° C. for a time from 15 minutes to 60 minutes to form a first coating layer and a second coating layer. The second coating composition may be different from the first coating composition. The second coating composition may be the coating composition of the present disclosure which includes: (a) a polymeric resin including hydroxyl functional groups; (b) a polyisocyanate crosslinker; (c) a thiol including at least 2 active hydrogen groups, wherein the active hydrogen groups include a thiol group, a hydroxyl group, and/or a combination thereof, and wherein at least one of the active hydrogen groups includes a thiol group; and (d) a tin-based catalyst, wherein the ratio of the number of moles of thiol to the number of moles of tin is less than or equal to 100:1 and the amount of (d) the tin-based catalyst is less than or equal to 0.25% by weight relative to the total resin solids, and/or wherein the ratio of the number of moles of thiol to the number of moles of tin ranges from 3:1 to 50:1 and the amount of (d) the tin-based catalyst is less than or equal to 0.4% by weight relative to the total resin solids.

The first coating composition and the second coating composition of the multi-layer coating system may be heated to a temperature of at least 80° C. for a time from 15 minutes to 60 minutes. The first coating composition and the second coating composition of the multi-layer coating system may be heated to a temperature of less than or equal to 100° C. for a time from 20 minutes to 60 minutes to form the first coating layer and the second coating layer. The temperature of less than or equal to 100° C. is the temperature of the coating on the substrate. The first coating composition and the second coating composition of the multi-layer coating composition may be heated to a temperature of from 80° C. to 120° C. for a time from 20 minutes to 60 minutes. The temperature of from 80° C. to 120° C. is the temperature of the coating on the substrate.

EXAMPLES

The following examples are presented to demonstrate the general principles of the disclosure. The disclosure should not be considered as limited to the specific examples.

Part A: Preparation of Coating Compositions

The following clear coat (CC) coating compositions were prepared by mixing Pack A with Pack B, as provided in Table 1. Comparative clear coat (CE) coating compositions were prepared by mixing the Pack A with Pack B, as provided in Table 2. Pack A was first prepared by mixing the components in an air powered overhead blade impeller for at least one minute. Pack A and Pack B were mixed in an air powered overhead blade impeller for at least one minute.

TABLE 1

Clear coat coating compositions

| | Normalized Parts by weight of Component | | | | | | | | | | |
|---|---|---|---|---|---|---|---|---|---|---|---|
| Components | CC-1 | CC-2 | CC-3 | CC-4 | CC-5 | CC-6 | CC-7 | CC-8 | CC-9 | CC-10 | CC-11 |
| A Pack | | | | | | | | | | | |
| Ethyl 3-Ethoxypropionate (EEP) | 7.32 | 7.31 | 7.24 | 7.31 | 7.29 | 7.16 | 7.30 | 7.25 | 7.00 | 7.29 | 7.21 |
| Methyl N-Amyl Ketone (MAK) | 3.33 | 3.32 | 3.29 | 3.32 | 3.31 | 3.25 | 3.32 | 3.29 | 3.18 | 3.31 | 3.27 |
| Di(propylene glycol) methyl ether acetate (DPMA) | 1.88 | 1.87 | 1.86 | 1.87 | 1.87 | 1.83 | 1.87 | 1.86 | 1.79 | 1.87 | 1.85 |
| Acetone | 5.34 | 5.33 | 5.28 | 5.33 | 5.31 | 5.22 | 5.33 | 5.29 | 5.11 | 5.32 | 5.26 |
| PETMP[1] | 0.02 | 0.11 | 0.53 | 0.03 | 0.21 | 1.05 | 0.06 | 0.42 | 2.04 | 0.10 | 0.63 |
| 10% Dibutyltin dilaurate (DBTDL) (in xylene) | 0.28 | 0.28 | 0.27 | 0.55 | 0.55 | 0.54 | 1.10 | 1.09 | 1.06 | 1.65 | 1.63 |
| CHISORB 328[2] | 1.18 | 1.18 | 1.17 | 1.18 | 1.18 | 1.16 | 1.18 | 1.17 | 1.13 | 1.18 | 1.17 |
| Tinuvin 292[3] | 0.51 | 0.51 | 0.50 | 0.51 | 0.50 | 0.50 | 51.96 | 51.57 | 49.82 | 51.87 | 51.29 |
| Acrylic Polyol[4] | 52.10 | 52.00 | 51.55 | 52.05 | 51.86 | 50.96 | 0.51 | 0.50 | 0.48 | 0.50 | 0.50 |

TABLE 1-continued

Clear coat coating compositions

| Components | CC-1 | CC-2 | CC-3 | CC-4 | CC-5 | CC-6 | CC-7 | CC-8 | CC-9 | CC-10 | CC-11 |
|---|---|---|---|---|---|---|---|---|---|---|---|
| | Normalized Parts by weight of Component | | | | | | | | | | |
| Silica Dispersion[5] | 2.01 | 2.00 | 1.98 | 2.00 | 2.00 | 1.96 | 2.00 | 1.99 | 1.92 | 2.00 | 1.97 |
| BYK 320[6] | 0.04 | 0.04 | 0.04 | 0.04 | 0.04 | 0.04 | 0.04 | 0.04 | 0.04 | 0.04 | 0.04 |
| BYK 306[7] | 0.13 | 0.13 | 0.13 | 0.13 | 0.13 | 0.13 | 0.13 | 0.13 | 0.13 | 0.13 | 0.13 |
| EEP | 2.13 | 2.23 | 2.68 | 1.97 | 2.13 | 2.99 | 1.53 | 1.91 | 3.61 | 1.11 | 1.69 |
| B Pack | | | | | | | | | | | |
| Isocyanate[8] | 23.73 | 23.69 | 23.48 | 23.71 | 23.62 | 23.21 | 23.67 | 23.49 | 22.69 | 23.63 | 23.36 |
| Total | 100.00 | 100.00 | 100.00 | 100.00 | 100.00 | 100.00 | 100.00 | 100.00 | 100.00 | 100.00 | 100.00 |
| Ratio of Moles Thiol:Moles Tin | 3:1 | 20:1 | 100:1 | 3:1 | 20:1 | 100:1 | 3:1 | 20:1 | 100:1 | 3:1 | 20:1 |
| Amount of DTBL (% on 100 resin solids) | 0.06 | 0.06 | 0.06 | 0.12 | 0.12 | 0.12 | 0.24 | 0.24 | 0.24 | 0.36 | 0.36 |

[1]Pentaerythritol tetrakis(3-mercaptopropionate) commercially available from Bruno Bock GmbH (Marschacht, Germany).

[2]UV stabilizer available from Chitec Technology Co., Ltd. (Shanghai, China)

[3]Hindered amine light stabilizer commercially available from BASF (Ludwigshafen, Germany)

[4]Acrylic polyol described in US Patent Application No. 2004/0234698 Example 4, Footnote 5. The acrylic polyol was prepared from a batch process and having a Tg of 22° C., as calculated by the Flory-Fox equation, and a Mn of 2900, as measured by gel permeation chromatography using a polystyrene standard according to ASTM D6579-11.

[5]A fumed silica dispersion consisting of 8% Aerosil ® 812, a hydrophobic amorphous silica available from Evonik Industries (Essen, Germany), milled in a polymer consisting of 40% hydroxylpropyl acrylate, 20% styrene, 19% butyl acrylate, 18% butyl methacrylate, 2% acrylic acid, 0.5% methyl methacrylate in a solvent blend of 40% Aromatic 100 type and 60% methyl ether propylene glycol acetate available from Dow Chemical Company (Midland, MI) at 67% solids and about 8500 Mw. Additional methyl ether propylene glycol acetate was added for a total solids of 53%.

[6]A surface additive commercially available from BYK Additives and Instruments (Wesel, Germany).

[7]A surface additive commercially available from BYK Additives and Instruments (Wesel, Germany).

[8]DESMODUR N 3300 (available from Covestro (Leverkusen, Germany)) in a solvent solution at 68% solids.

TABLE 2

Comparative Clear Coat Coating Compositions

| Components | CE-1 | CE-2 | CE-3 | CE-4 | CE-5 | CE-6 | CE-7 | CE-8 | CE-9 |
|---|---|---|---|---|---|---|---|---|---|
| | Normalized Parts by weight of Component | | | | | | | | |
| A Pack | | | | | | | | | |
| EEP | 7.32 | 6.94 | 7.32 | 6.59 | 7.31 | 5.98 | 7.30 | 6.85 | 5.48 |
| MAK | 3.33 | 3.15 | 3.33 | 2.99 | 3.32 | 2.72 | 3.32 | 3.11 | 2.49 |
| DPMA | 1.88 | 1.78 | 1.87 | 1.69 | 1.87 | 1.53 | 1.87 | 1.75 | 1.40 |
| Acetone | 5.34 | 5.06 | 5.34 | 4.80 | 5.33 | 4.36 | 5.33 | 4.99 | 3.99 |
| PETMP[1] | 0 | 2.533 | 0 | 4.810 | 0 | 8.736 | 0 | 3.00 | 12.000 |
| 10% DBTDL (in xylene) | 0.28 | 0.26 | 0.55 | 0.50 | 1.10 | 0.90 | 1.65 | 1.55 | 1.24 |
| CHISORB 328[2] | 1.18 | 1.12 | 1.18 | 1.07 | 1.18 | 0.97 | 1.18 | 1.11 | 0.89 |
| Acrylic Polyol[3] | 52.12 | 49.37 | 52.09 | 46.87 | 52.03 | 42.56 | 51.97 | 48.72 | 38.98 |
| Tinuvin 292[4] | 0.51 | 0.48 | 0.51 | 0.46 | 0.51 | 0.41 | 0.51 | 0.47 | 0.38 |
| Silica Dispersion[5] | 2.01 | 1.90 | 2.01 | 1.80 | 2.00 | 1.64 | 2.00 | 1.88 | 1.50 |
| BYK 320[6] | 0.04 | 0.03 | 0.04 | 0.03 | 0.04 | 0.03 | 0.04 | 0.03 | 0.03 |
| BYK 306[7] | 0.13 | 0.13 | 0.13 | 0.12 | 0.13 | 0.11 | 0.13 | 0.13 | 0.10 |
| EEP (ER = 12) | 2.12 | 4.76 | 1.90 | 6.92 | 1.48 | 10.66 | 1.03 | 4.22 | 13.77 |
| B Pack | | | | | | | | | |
| Isocyanate[8] | 23.74 | 22.49 | 23.73 | 21.35 | 23.70 | 19.39 | 23.67 | 22.19 | 17.75 |
| Total | 100.00 | 100.00 | 100.00 | 100.00 | 100.00 | 100.00 | 100.00 | 100.00 | 100.00 |
| Ratio of Moles of Thiol:Moles of Tin | 0 | 500:1 | 0 | 500:1 | 0 | 500:1 | 0 | 100:1 | 500:1 |
| Amount of DBTL (% on 100 resin solids) | 0.06 | 0.06 | 0.12 | 0.12 | 0.24 | 0.24 | 0.36 | 0.36 | 0.36 |

Part B: Evaluating the Viscosity of the Coating Compositions

The viscosity of the coating compositions was tested 60 minutes after mixing Pack A and Pack B and 120 minutes after mixing Pack A and Pack B according to ASTM D4287 utilizing Brookfield CAP 2000+ viscometer with a #4 spindle running at 300 revolutions per minute (RPM) at 23° C. The resulting viscosity values of the coating compositions can be found in Table 3.

TABLE 3

Viscosity values for coating compositions

| Coating Composition | Viscosity (60 minutes, cP) | Viscosity (120 minutes, cP) |
|---|---|---|
| CC-1 | 48 | 48 |
| CC-2 | 53 | 53 |
| CC-3 | 62 | 62 |
| CC-4 | 47 | 71 |
| CC-5 | 54 | 55 |
| CC-6 | 54 | 60 |
| CC-7 | 50 | 107 |
| CC-8 | 46 | 72 |
| CC-9 | 51 | 82 |
| CC-10 | 55 | 211 |
| CC-11 | 54 | 70 |
| CE-1 | 57 | 72 |
| CE-2 | 128 | Gelled |
| CE-3 | 65 | 136 |
| CE-4 | Gelled | Gelled |
| CE-5 | 121 | >220 |
| CE-6 | Gelled | Gelled |
| CE-7 | >220 | Gelled |
| CE-8 | 139 | Gelled |
| CE-9 | Gelled | Gelled |

The inventive clear coat coating compositions (CC-1 to CC-11) had viscosities that were less than 220 cP 60 minutes after mixing Pack A and Pack B and 120 minutes after mixing Pack A and Pack B.

Part C: Preparation of Multi-Layer Coatings

A waterborne basecoat (A1) commercially available from PPG Industries, Inc. or a solventborne based coat (B1) commercially available from PPG Industries, Inc. was spray applied over primed electrocoated panels (ED6060C) obtained from ACT Test Panels, LLC of Hillsdale, Michigan.

The waterborne basecoat (A1) was applied in two coats and then flashed at ambient temperature for 10 minutes and then dehydrated at 80° C. for 10 minutes. The dry film thickness was approximately 14-16 microns, as determined by a PERMASCOPE using ASTM D7091.

The solventborne basecoat (B1) was applied in two coats with one minute between coats and then flashed at ambient temperature for four minutes. The solventborne basecoat dry film thickness was approximately 14-16 microns, as determined by a PERMASCOPE using ASTM D7091.

Multi-layer coatings having a basecoat layer and a clear coat layer were prepared according to Table 4. The clear coat coating compositions were spray applied over the basecoat coated panels in two coats, with a 1 minute flash between coats. The clear coat compositions were flashed for 10 minutes at ambient conditions, then baked in an oven for 30 minutes at 80° C. The clear coat layer had a dry film thickness of approximately 35-40 microns.

TABLE 4

Multi-layer coatings

| Multi-Layer Coating | Basecoat Layer | Clear Coat Coating Layer |
|---|---|---|
| A | A1 | CC-1 |
| B | A1 | CC-2 |
| C | A1 | CC-3 |
| D | A1 | CC-4 |
| E | A1 | CC-5 |
| F | A1 | CC-6 |
| G | A1 | CC-7 |
| H | A1 | CC-8 |
| I | A1 | CC-9 |
| J | A1 | CC-10 |
| K | A1 | CC-11 |
| L | B1 | CC-1 |
| M | B1 | CC-2 |
| N | B1 | CC-3 |
| O | B1 | CC-4 |
| P | B1 | CC-5 |
| Q | B1 | CC-6 |
| R | B1 | CC-7 |
| S | B1 | CC-8 |
| T | B1 | CC-9 |
| U | B1 | CC-10 |
| V | B1 | CC-11 |
| CE-A | A1 | CE-2 |
| CE-B | A1 | CE-4 |
| CE-C | A1 | CE-6 |
| CE-D | A1 | CE-8 |
| CE-E | A1 | CE-9 |
| CE-F | B1 | CE-2 |
| CE-G | B1 | CE-4 |
| CE-H | B1 | CE-6 |
| CE-I | B1 | CE-8 |
| CE-J | B1 | CE-9 |

Part D: Testing of Multi-Layer Coatings

The testing of properties for cure were performed initially at 1-hour post-bake. Hardness was measured utilizing the Koenig pendulum device according to ASTM D4366-16. Appearance was measured with a BYK Wavescan averaged over three scans. The resulting properties of the multi-layer coatings can be found in Table 5. DOI is distinctness of image according to ASTM E430; SW is shortwave determined from the BYK Wavescan; and LW is longwave determined from the BYK Wavescan.

TABLE 5

Multi-layer coating properties

| Multi-Layer Coating | DOI | SW | LW | 1 Hour Hardness | 7 Day Hardness |
|---|---|---|---|---|---|
| A | 82 | 45 | 9 | 68 | 112 |
| B | 83 | 37 | 8 | 72 | 116 |
| C | 82 | 44 | 8 | 68 | 107 |
| D | 82 | 33 | 8 | N/A | 96 |
| E | 82 | 39 | 8 | 63 | 94 |
| F | 81 | 35 | 8 | 68 | 83 |
| G | 83 | 44 | 9 | 46 | 62 |
| H | 85 | 40 | 10 | 47 | 66 |
| I | 84 | 40 | 8 | 37 | 55 |
| J | 79 | 52 | 12 | 47 | 53 |
| K | 81 | 48 | 12 | 46 | 53 |
| L | 93 | 31 | 6 | 52 | 82 |
| M | 91 | 35 | 7 | 50 | 88 |
| N | 90 | 37 | 8 | 49 | 81 |
| O | 93 | 25 | 5 | 56 | 74 |
| P | 94 | 24 | 5 | 52 | 75 |
| Q | 92 | 34 | 6 | 55 | 68 |
| R | 92 | 30 | 7 | 41 | 50 |
| S | 87 | 40 | 10 | 41 | 50 |
| T | 90 | 40 | 7 | 36 | 47 |

TABLE 5-continued

| Multi-layer coating properties | | | | | |
|---|---|---|---|---|---|
| Multi-Layer Coating | DOI | SW | LW | 1 Hour Hardness | 7 Day Hardness |
| U | 91 | 32 | 8 | 53 | 61 |
| V | 87 | 39 | 10 | 49 | 56 |
| CE-A | 82 | 46 | 11 | 63 | 68 |
| CE-B | 62 | 18 | 13 | 53 | 47 |
| CE-C | N/A | N/A | N/A | N/A | N/A |
| CE-D | 81 | 52 | 14 | 40 | 50 |
| CE-E | N/A | N/A | N/A | N/A | N/A |
| CE-F | 85 | 50 | 15 | 40 | 47 |
| CE-G | N/A | N/A | N/A | 36 | 33 |
| CE-H | N/A | N/A | N/A | N/A | N/A |
| CE-I | 84 | 53 | 14 | 34 | 37 |
| CE-J | N/A | N/A | N/A | N/A | N/A |

The multi-layer coatings A-V had a suitable appearance, as indicated by the DOI and SW values, and a suitable hardness within one hour and after 7 days. Comparative Examples CE-B to CE-E and CE-G to CE-J did not have the combination of an acceptable appearance and an acceptable hardness. While CE-A and CE-F had an acceptable appearance and hardness, the viscosity of the coating composition after 120 minutes was unacceptable (see Table 3). The clear coating composition CE-2 used in the multi-layer coatings of CE-A and CE-F was difficult to work with given its high viscosity.

Part E: Thiol Component Comparison

The clear coat composition CC-5 was prepared using a different thiol compounds, as indicated below in Table 6. The viscosity of the coating compositions was tested immediately after mixing Pack A and Pack B and 4 hours after mixing Pack A and Pack B, using the method described above. The viscosity results can be found in Table 7.

The clear coat compositions were applied to electrocoated panels, as described above in Part C. The clear coat coatings were characterized for appearance and hardness, the results of which can be found in Table 7.

TABLE 6

| Coating compositions prepared with various thiol compounds | | | | |
|---|---|---|---|---|
| Clear Coat Coating Composition | Thiol Compound | Thiol Groups per Molecule | Amount of DBTL (% on 100 resin solids) | Ratio of Moles of thiol:moles of tin |
| CC-12 | PETMP[9] | 4 | 0.12 | 20:1 |
| CC-13 | PETMA[10] | 4 | 0.12 | 20:1 |
| CC-14 | BMETPT[11] | 3 | 0.12 | 20:1 |
| CC-15 | BMP[12] | 1 | 0.12 | 20:1 |
| CC-16 | Thioglycerol[13] | 1 | 0.12 | 20:1 |
| CC-17 | TMPMP[14] | 3 | 0.12 | 20:1 |
| CE-K | None | 0 | 0.12 | 0 |

[9]Pentaerythritol tetrakis(3-mercaptopropionate) commercially available from Bruno Bock GMBH (Marschacht, Germany).
[10]Pentaerythritol tetrakis (2-mercaptoacetate) commercially available from Sigma-Aldrich.
[11]2,3-bis((2-mercaptoethyl)thio)-1-propanethiol commercially available from Sigma-Aldrich.
[12]Butyl 3-mercaptopropionate commercially available from Sigma-Aldrich.
[13]1-Thioglycerol commercially available from Sigma-Aldrich.
[14]Trimethylolpropane tris(3-mercaptopropionate) commercially available from Sigma-Aldrich.

TABLE 7

| Properties of coating compositions and coating layers | | | | | | | |
|---|---|---|---|---|---|---|---|
| Coating Composition | Viscosity (Initial, cP) | Viscosity (4 Hours, cP) | DOI | SW | LW | 1 Day Hardness | 13 Day Hardness |
| CC-12 | 57 | 102 | 97 | 3 | 0.4 | 162 | 190 |
| CC-13 | 60 | Gelled | 96 | 11 | 0.9 | 146 | 194 |
| CC-14 | 60 | 62 | 96 | 2 | 0.4 | 180 | 200 |
| CC-15 | 60 | Gelled | 96 | 6 | 1.9 | 131 | 175 |
| CC-16 | 64 | 113 | 97 | 2 | 1.2 | 193 | 201 |
| CC-17 | 57 | 65 | 97 | 3 | 0.7 | 165 | 192 |
| CE-K | 65 | Gelled | 95 | 14 | 3 | 121 | 167 |

Whereas particular embodiments of this disclosure have been described above for purposes of illustration, it will be evident to those skilled in the art that numerous variations of the details of the present disclosure may be made without departing from the disclosure as defined in the appended claims.

What is claimed is:

1. A coating composition comprising:

(a) a polymeric resin comprising hydroxyl functional groups;

(b) a polyisocyanate crosslinker;

(c) a thiol comprising at least 2 active hydrogen groups, wherein the active hydrogen groups comprise a thiol group or a combination of a thiol group and a hydroxyl group, and (d) a tin-based catalyst, wherein the ratio of the number of moles of thiol to the number of moles of tin is less than or equal to 100:1 and the amount of (d) the tin-based catalyst is less than or equal to 0.25% by weight relative to the total resin solids, and/or the ratio of the number of moles of thiol to the number of moles of tin ranges from 3:1 to 50:1 and the amount of (d) the tin-based catalyst is less than or equal to 0.4% by weight relative to the total resin solids; and wherein when the coating composition is applied to a substrate and cured, the coating exhibits: an appearance of greater than 75 in distinctness of image (DOI), as measured according to ASTM E430, an appearance of not greater than 50 in the shortwave (SW), and a 7 day hardness value of at least 45, as measured according to ASTM D4366-16.

2. The coating composition of claim 1, wherein the amount of (d) the tin-based catalyst is greater than or equal to 0.05% by weight relative to the total resin solids.

3. The coating composition of claim 1, wherein (a) the polymeric resin comprising hydroxyl functional groups comprises a polyester polymer, an (meth)acrylic polymer, and/or a polyurethane polymer.

4. The coating composition of claim 3, wherein the (a) polymeric resin comprising hydroxyl functional groups comprises a hydroxyl equivalent weight of up to 1,000 grams per equivalent based on the total resin solids of the polymeric resin.

5. The coating composition of claim 1, wherein (b) the polyisocyanate crosslinker comprises an aliphatic polyisocyanate.

6. The coating composition of claim 1, wherein (b) the polyisocyanate crosslinker comprises an average isocyanate functionality of greater than 2.

7. The coating composition of claim 1, wherein (c) the thiol comprising at least 2 active hydrogen groups comprises at least three thiol groups.

8. The coating composition of claim 1, wherein (c) the thiol comprising at least 2 active hydrogen groups comprises at least four thiol groups.

9. The coating composition of claim 8, wherein the (c) the thiol comprising at least 2 active hydrogen groups comprises at least four thiol groups and comprises an active hydrogen group equivalent weight of at least 100 grams per equivalents based on the total resin solids of the thiol comprising at least 2 active hydrogen groups.

10. The coating composition of claim 1, wherein (c) the thiol comprising at least 2 active hydrogen groups comprises at least 3 active hydrogen groups.

11. The coating composition of claim 1, wherein (c) the thiol comprising at least 2 active hydrogen groups comprises pentaerythritol tetrakis(3-mercaptoacetate), 1-thioglycerol, trimethylolpropane tri(3-mercaptopropionate), 2,3-bis((2-mercaptoethyl)thio)-1-propanethiol, and/or some combination thereof.

12. The coating composition of claim 1, wherein (d) the tin-based catalyst comprises dibutyltin dilaurate, dibutyltin diacetate, dibutyltin mercaptide, dibutyltin diacetate, dibutyl tin dimaleate, dimethyl tin diacetate, dimethyl tin dilaurate, tin octoate, and/or some combination thereof.

13. The coating composition of claim 1, wherein the coating composition exhibits a viscosity of less than 220 centipoise after 120 minutes, as measured according to ASTM D4287 and at 23° C.

14. A multi-layer coating system comprising:

(1) a substrate;

(2) a first coating layer formed over at least a portion of the substrate, the first coating layer obtained from a first coating composition; and (3) a second coating layer formed over at least a portion of the first coating layer, the second coating layer obtained from a second coating composition that is different from the first coating composition, wherein the second coating composition is the coating composition of claim 1; the second coating layer is an outermost layer; and the multi-layer coating system exhibits: an appearance of greater than 75 in distinctness of image (DOI), as measured according to ASTM E430, an appearance of not greater than 50 in the shortwave (SW), and a 7 day hardness value of at least 45, as measured according to ASTM D4366-16.

15. The multi-layer coating system of claim 14, wherein the substrate comprises a vehicle component.

16. The multi-layer coating system of claim 14, wherein the second coating layer comprises a clearcoat layer.

17. The multi-layer coating system of claim 14, wherein the second coating layer comprises a pigmented top coat layer.

* * * * *